(12) United States Patent
Ying et al.

(10) Patent No.: US 10,597,107 B2
(45) Date of Patent: Mar. 24, 2020

(54) ELECTRIC VEHICLE

(71) Applicant: Hangzhou Chic Intelligent Technology Co., Ltd., Hangzhou (CN)

(72) Inventors: Jiawei Ying, Hangzhou (CN); Shaojun Cao, Hangzhou (CN)

(73) Assignee: Hangzhou Chic Intelligent Technology Co., Ltd., Hangzhou (CN)

( * ) Notice: Subject to any disclaimer, the term of this patent is extended or adjusted under 35 U.S.C. 154(b) by 0 days.

(21) Appl. No.: 16/658,020

(22) Filed: Oct. 18, 2019

(65) Prior Publication Data

US 2020/0047839 A1 Feb. 13, 2020

Related U.S. Application Data

(63) Continuation of application No. 16/429,636, filed on Jun. 3, 2019, now Pat. No. 10,486,764, which is a
(Continued)

(30) Foreign Application Priority Data

Jun. 13, 2014 (CN) .......................... 2014 1 0262353

(51) Int. Cl.
*B62K 11/00* (2006.01)
*B62D 61/02* (2006.01)
(Continued)

(52) U.S. Cl.
CPC .......... *B62K 11/007* (2016.11); *B62D 51/001* (2013.01); *B62D 51/02* (2013.01);
(Continued)

(58) Field of Classification Search
CPC .............................. B62K 11/007; B62K 3/002
See application file for complete search history.

(56) References Cited

U.S. PATENT DOCUMENTS

| 5,791,425 A | 8/1998 | Kamen et al. |
| 6,050,357 A | 4/2000 | Staelin et al. |
| (Continued) | | |

FOREIGN PATENT DOCUMENTS

| CN | 100431906 C | 11/2008 |
| CN | 101920728 A | 12/2010 |
| (Continued) | | |

OTHER PUBLICATIONS

International Search Report dated Mar. 11, 2015 in connection with International Patent Application No. for PCT/C2014/092849, 2 pages.
(Continued)

*Primary Examiner* — Kevin Hurley

(57) ABSTRACT

An electric self-balancing vehicle including a top cover, a bottom cover, an inner cover, a rotating mechanism, two wheels, two hub motors, a plurality of sensors, a power supply, and a controller is described herein. The top cover includes a first top cover and a second top cover disposed symmetrically and rotatable relative to each other. The bottom cover is fixed to the top cover and includes a first bottom cover and a second bottom cover disposed symmetrically and rotatable relative to each other. The inner cover is fixed between the top cover and the bottom cover and includes a first inner cover and a second inner cover disposed symmetrically and rotatable relative to each other. The rotating mechanism is fixed between the first inner cover and the second inner cover. The two wheels are rotatably fixed at two sides of the inner cover, respectively. The two hub motors are fixed in the two wheels, respectively. The plurality of sensors is disposed between the bottom cover and the inner cover, respectively. The power supply is fixed between the first bottom cover and the first inner cover. The controller is fixed between the second bottom cover and the second inner cover, the controller is electrically connected
(Continued)

with the plurality of sensors, the power supply, and the hub motors, and the controller controls the hub motors to drive the corresponding wheels to rotate according to sensing signals transmitted by the sensors.

25 Claims, 6 Drawing Sheets

Related U.S. Application Data continuation of application No. 15/160,589, filed on May 20, 2016, now Pat. No. 10,336,392, which is a continuation of application No. 14/773,650, filed as application No. PCT/CN2014/092849 on Dec. 2, 2014, now Pat. No. 9,376,155.

(51) Int. Cl.
    B62D 51/02    (2006.01)
    B62D 51/00    (2006.01)
    B62K 17/00    (2006.01)
    B62K 3/00     (2006.01)

(52) U.S. Cl.
    CPC ............ *B62D 61/02* (2013.01); *B62K 3/002* (2013.01); *B62K 17/00* (2013.01); *B62K 2204/00* (2013.01); *B62K 2207/00* (2013.01); *Y02T 10/7258* (2013.01)

(56) References Cited

U.S. PATENT DOCUMENTS

| | | |
|---|---|---|
| 6,113,517 A | 9/2000 | Salecker et al. |
| 6,288,505 B1 | 9/2001 | Heinzmann et al. |
| 6,302,230 B1 | 10/2001 | Kamen et al. |
| 6,367,817 B1 | 4/2002 | Kamen et al. |
| 6,538,411 B1 | 3/2003 | Field et al. |
| 6,581,714 B1 | 6/2003 | Kamen et al. |
| 6,651,763 B1 | 11/2003 | Kamen et al. |
| 6,796,396 B2 | 9/2004 | Kamen et al. |
| 6,920,947 B2 | 7/2005 | Kamen et al. |
| 7,023,330 B2 | 4/2006 | Kamen et al. |
| 7,083,178 B2 | 8/2006 | Potter |
| 7,090,040 B2 | 8/2006 | Kamen et al. |
| 7,195,259 B2 | 3/2007 | Gang |
| 7,275,607 B2 | 10/2007 | Kamen et al. |
| 7,338,056 B2 | 3/2008 | Chen et al. |
| 7,363,993 B2 | 4/2008 | Ishii |
| 7,367,572 B2 | 5/2008 | Jiang |
| 7,467,681 B2 | 12/2008 | Hiramatsu |
| 7,479,872 B2 | 1/2009 | Kamen et al. |
| 7,481,291 B2 | 1/2009 | Nishikawa |
| D601,922 S | 10/2009 | Imai et al. |
| 7,740,099 B2 | 6/2010 | Field et al. |
| 7,775,534 B2 | 8/2010 | Chen et al. |
| 7,783,392 B2 | 8/2010 | Oikawa |
| 7,857,088 B2 | 12/2010 | Field et al. |
| 7,926,825 B2 | 4/2011 | Chen |
| 7,958,956 B2 | 6/2011 | Kakinuma et al. |
| 7,988,159 B2 | 8/2011 | Chen |
| 8,014,923 B2 | 9/2011 | Ishii et al. |
| 8,028,777 B2 | 10/2011 | Kakinuma et al. |
| D647,991 S | 11/2011 | Sramek |
| 8,047,556 B2 | 11/2011 | Jang et al. |
| 8,113,524 B2 | 2/2012 | Karpman |
| 8,157,274 B2 | 4/2012 | Chen |
| 8,170,780 B2 | 5/2012 | Field et al. |
| 8,225,891 B2 | 7/2012 | Takenaka et al. |
| 8,322,478 B2 | 12/2012 | Kim |
| 8,408,565 B2 | 4/2013 | An |
| 8,459,668 B2 | 6/2013 | Yoon |
| 8,467,941 B2 | 6/2013 | Field et al. |
| 8,469,376 B2 | 6/2013 | Kristiansen |
| 8,490,723 B2 | 7/2013 | Heinzmann et al. |
| 8,584,782 B2 | 11/2013 | Chen |
| 8,606,468 B2 | 12/2013 | Kosaka |
| 8,684,123 B2 | 4/2014 | Chen |
| 8,738,278 B2 | 5/2014 | Chen |
| 8,807,250 B2 | 8/2014 | Chen |
| 8,960,353 B2 | 2/2015 | Chen |
| 8,978,791 B2 | 3/2015 | Ha et al. |
| 9,045,190 B2 | 6/2015 | Chen |
| D737,723 S | 9/2015 | Ying et al. |
| D738,256 S | 9/2015 | Ying et al. |
| D739,906 S | 9/2015 | Chen |
| 9,211,937 B2 | 12/2015 | Chen |
| 9,376,155 B2 | 6/2016 | Ying et al. |
| 9,499,228 B2 | 11/2016 | Chang |
| D786,995 S | 5/2017 | Ying |
| 9,682,732 B2 | 6/2017 | Strack |
| 9,896,146 B2 | 2/2018 | Lu |
| 10,167,036 B2 | 1/2019 | Ying |
| 10,167,037 B2 | 1/2019 | Ying |
| 10,207,764 B2 | 2/2019 | Li et al. |
| 2004/0005958 A1 | 1/2004 | Kamen et al. |
| 2006/0260857 A1 | 11/2006 | Kakinuma et al. |
| 2007/0273118 A1 | 11/2007 | Conrad |
| 2008/0147281 A1 | 6/2008 | Ishii et al. |
| 2009/0032323 A1 | 2/2009 | Kakinuma et al. |
| 2009/0115149 A1 | 5/2009 | Wallis et al. |
| 2009/0200746 A1 | 8/2009 | Yamamoto |
| 2009/0315293 A1 | 12/2009 | Kosaka |
| 2010/0025139 A1 | 2/2010 | Kosaka et al. |
| 2010/0114468 A1 | 5/2010 | Field et al. |
| 2010/0117316 A1 | 5/2010 | Weiner et al. |
| 2010/0121538 A1 | 5/2010 | Ishii et al. |
| 2010/0222994 A1 | 9/2010 | Field et al. |
| 2010/0225080 A1 | 9/2010 | Smith |
| 2011/0006497 A1 | 1/2011 | Chen et al. |
| 2011/0282532 A1 | 11/2011 | Kosaka et al. |
| 2012/0007331 A1 | 1/2012 | Hsieh |
| 2012/0035809 A1 | 2/2012 | Kosaka |
| 2012/0187648 A1 | 7/2012 | Chen |
| 2013/0228385 A1 | 9/2013 | Chen |
| 2013/0238231 A1 | 9/2013 | Chen |
| 2015/0096820 A1 | 4/2015 | Strack |
| 2016/0129963 A1 | 5/2016 | Ying et al. |
| 2016/0207584 A1 | 7/2016 | Ying et al. |
| 2016/0325803 A1 | 11/2016 | Waxman et al. |
| 2017/0183053 A1 | 6/2017 | Zeng et al. |
| 2018/0037293 A1 | 2/2018 | Chen et al. |
| 2019/0031269 A1 | 1/2019 | Shang |
| 2019/0077479 A1 | 3/2019 | Chen et al. |
| 2019/0193803 A1 | 6/2019 | Desberg et al. |

FOREIGN PATENT DOCUMENTS

| | | |
|---|---|---|
| CN | 202201103 U | 4/2012 |
| CN | 102514662 A | 6/2012 |
| CN | 102602481 A | 7/2012 |
| CN | 202669532 U | 1/2013 |
| CN | 203158157 U | 8/2013 |
| CN | 203186511 U | 9/2013 |
| CN | 203268232 U | 11/2013 |
| CN | 203268242 U | 11/2013 |
| CN | 103529850 A | 1/2014 |
| CN | 203381739 U | 1/2014 |
| CN | 103600796 A | 2/2014 |
| CN | 203698535 U | 7/2014 |
| CN | 104014123 A | 9/2014 |
| CN | 104029769 A | 9/2014 |
| CN | 104149899 A | 11/2014 |
| CN | 104163222 A | 11/2014 |
| CN | 203996649 U | 12/2014 |
| CN | 204050913 U | 12/2014 |
| CN | 302534790 | 12/2014 |
| EP | 1630086 A1 | 3/2006 |
| EP | 1791609 A1 | 6/2007 |
| JP | 2005094898 A | 4/2005 |
| JP | 2005335471 A | 12/2005 |
| JP | 2006008013 A | 1/2006 |
| JP | 2014151721 A | 8/2014 |
| RU | 2456195 C2 | 7/2012 |

(56) References Cited

FOREIGN PATENT DOCUMENTS

OTHER PUBLICATIONS

Written Opinion of the International Searching Authority dated Mar. 11, 2015 in connection with International Patent Application No. for PCT/CN2014/092849, 6 pages.
Kim, "Development of a Two-Wheeled Mobile Tilting & Balancing (MTB) Robot", 2011 11th International Conference on Control, Automation and Systems (ICCAS), Oct. 26-29, 2011, 6 pages.
Kickstarter Website: Hovertrax, by Inventist, as evidenced by a web archive captured by the Internet Archive (www.archive.org) on May 4, 2013, https://web.archive.org/web/20130504083823/http:/www.kickstarter.com/projects/687658339/hovertrax ("Hovertrax Kickstarter"), 11 pages.
Hovertrax Guide and Manual, 2014, 15 pages.
Segway Reference Manual, 2013, 52 pages.
Segway User Manual, Apr. 17, 2014, 144 pages.
Segway LLC, "Basic Rider Optimization Training for the Segway Human Transporter (HT) i Series, e Series and p Series models", Instructor Guide and Participant Workbook, Jan. 2004, 106 pages.
Segway, "Segway i2", Bild Segway Explosionszeichnung, (May 9, 2008), URL: http://media.bestofmicro.com/3/2/156926/original/segway_i2_technik2.jpg.
Anonymous, "Ninebot PTR", User Manual Ninebot, (Oct. 12, 2013), p. 1,3,20,29, URL: https://www.manualslib.com/manual/879594/Ninebot-Personal-Transportation-Robot.html.
Msjifyournasty, "Inventist Inc, Solo Wheel, Orbit wheel @ Toy Fair 2013", YouTube, Feb. 10, 2013, URL: https://www.youtube.com/watch?v=w8rHKCjLAWI.
Inventist Inc, "Hovertrax by Inventist!", YouTube, May 17, 2013, URL: https://www.youtube.com/watch?v=fu2RH_nsVE0.
Coelho et al., "Development of a Mobile Two-Wheel Balancing Platform for Autonomous Applications", 15th International Conference on Mechatronics and Machine Vision in Practice, Dec. 2-4, 2008, pp. 575-580.
Choi et al., "Four and Two Wheel Transformable Dynamic Mobile Platform", 2011 IEEE International Conference on Robotics and Automation (ICRA), May 9-13, 2011, 4 pages.
Chiu et al., "Design and implement of the self-dynamic controller for two wheel transporter", 2006 IEEE International Conference on Fuzzy Systems, Jul. 16-21, 2006, pp. 480-483.
Abheygunawardhana et al., "Vibration Suppression of Two-Wheel Mobile Manipulator Using Resonance-Ratio-Control-Based Null-Space Control", IEEE Transactions on Industrial Electronics, vol. 57, No. 12, Dec. 2010, pp. 4137-4146.
Clark et al. "EDGAR, a Self-Balancing Scooter Final Report", Oct. 27, 2005, 182 pages.
Azizan et al., "Fuzzy Control Based on LMI Approach and Fuzzy Interpretation of the Rider Input for Two Wheeled Balancing Human Transporter", 2010 8th IEEE International Conference on Control and Automation, Jun. 9-11, 2010, p. 192-197.
Cardozo et al., "Prototype for a Self-Balanced Personal Transporter", 2012 Workshop on Engineering Applications, May 2-4, 6 pages.
Li et al., A coaxial couple wheeled equilibrium robot with T-S fuzzy equilibrium control, Industrial Robot: An International Journal, vol. 38, Issue 3, May 3, 2011, 10 pages.
Li et al., "Controller Design of a Two-Wheeled Inverted Pendulum Mobile Robot", 2008 IEEE International Conference on Mechatronics and Automation, Aug. 5-8, 2008, pp. 7-12.
Li et al., "Mechanical Design and Dynamic Modeling of a Two-Wheeled Inverted Pendulum Mobile Robot", Proceedings of the 2007 IEEE International Conference on Automation and Logistics, Aug. 18-21, 2007, pp. 1614-1619.
Lin et al., "Adaptive Robust Self-Balancing and Steering of a Two-Wheeled Human Transportation Vehicle", J Intell Robot Syst., Aug. 27, 2010, 21 pages.
Sasaki et al., "Forward and Backward Motion Control of Personal Riding-type Wheeled Mobile Platform", Proceedings of the 2004 IEEE International Conference on Robotics and Automation, Apr. 26-May 1, 2004, p. 3331-3336.
Seo et al., "Simulation of Attitude Control of a Wheeled Inverted Pendulum", International Conference on Control, Automation, and Systems, Oct. 17-20, 2007, p. 2264-2269.
Tsai et al., "Intelligent Adaptive Motion Control Using Fuzzy Basis Function Networks for Self-Balancing Two-Wheeled Transporters", 2010 IEEE Conference on Fuzzy Systems, Jul. 18-23, 2010, p. 1-6.
Sasaki et al., "Steering Control of Personal Riding-type Wheeled Mobile Platform (PMP)", Aug. 2-6, 2005, 6 pages.
Vijay Kumar, "What is a Hoverboard—When was the Hoverboard Invented", 8 pages.
Danielle Frost, "Camas Resident Will Feature Latest Invention at National Show", Camas-Washougal Post-Record, Jun. 5, 2012, 5 pages.

ELECTRIC VEHICLE

CROSS-REFERENCE TO RELATED APPLICATIONS

This application is a continuation of U.S. patent application Ser. No. 16/429,636 filed on Jun. 3, 2019, which is a continuation application of U.S. patent application Ser. No. 15/160,589 filed on May 20, 2016, now U.S. Pat. No. 10,336,392, issued on Jul. 2, 2019, which is a continuation application of U.S. patent application Ser. No. 14/773,650, filed on Sep. 8, 2015, now U.S. Pat. No. 9,376,155, issued on Jun. 28, 2016, which is a 371 of International Application No. PCT/CN2014/092849, filed on Dec. 2, 2014, which claims priority to Chinese Patent Application No. 2014-10262353.9 filed on Jun. 13, 2014, the disclosures of which are herein incorporated by reference in their entirety.

TECHNICAL FIELD

The present invention relates to an electric balance two-wheeled vehicle, of which two platforms for carrying people can rotate relative to each other to drive.

BACKGROUND

An electric self-balancing vehicle is also known as a somatosensory vehicle or a sensor controlled vehicle. The operating principle thereof is mainly established on a basic principle called "dynamic stabilization", the change of car attitudes is detected by a gyroscope and an acceleration sensor inside the vehicle body, and a motor is accurately driven by a servo control system to adjust correspondingly, in order to keep the balance of the system.

The existing electric self-balancing vehicle generally has an operating rod. A user stands on a foot platform of the self-balancing vehicle to operate the operating rod so as to advance, retreat, and stop, and this control is also known as "manual control". The foot platform of the existing self-balancing vehicle is generally a flat plate, and the foot platform is always kept in a horizontal state during use and cannot rotate relatively. Therefore, the user cannot control the self-balancing vehicle merely through the feet.

BRIEF SUMMARY OF THE INVENTION

In order to overcome at least one defect in the prior art, the present invention provides an electric self-balancing vehicle.

To achieve the above objective, the present invention provides an electric self-balancing vehicle including a top cover, a bottom cover, an inner cover, a rotating mechanism, two wheels, two hub motors, a plurality of sensors, a power supply, and a controller. The top cover includes a first top cover and a second top cover disposed symmetrically and rotatable relative to each other. The bottom cover is fixed to the top cover, and the bottom cover includes a first bottom cover and a second bottom cover disposed symmetrically and rotatable relative to each other. The inner cover is fixed between the top cover and the bottom cover, and the inner cover includes a first inner cover and a second inner cover disposed symmetrically and rotatable relative to each other. The rotating mechanism is fixed between the first inner cover and the second inner cover. The two wheels are rotatably fixed at two sides of the inner cover, respectively. The two hub motors are fixed in the two wheels, respectively. The plurality of sensors is disposed between the bottom cover and the inner cover, respectively. The power supply is fixed between the first bottom cover and the first inner cover. The controller is fixed between the second bottom cover and the second inner cover. The controller is electrically connected with the plurality of sensors, the power supply, and the hub motors, and the controller controls the hub motors to drive the corresponding wheels to rotate according to sensing signals transmitted by the sensors.

According to one embodiment of the invention, the electric self-balancing vehicle may further include two pedals fixed to the top cover and the inner cover.

According to one embodiment of the invention, the pedals may have mutually separated friction strips disposed on upper surfaces of the pedals.

According to one embodiment of the invention, the first top cover and the second top cover may have hollow spaces, respectively, the first inner cover and the second inner cover may have recesses at positions corresponding to the hollow spaces, respectively, and the hollow spaces may be combined with the recesses to form pedal cavities for containing the pedals.

According to one embodiment of the invention, the rotating mechanism may include two bearings, a shaft sleeve, and two snap springs, the two bearings may be fixed to the first inner cover and the second inner cover, respectively, and the shaft sleeve may be fixed inside the two bearings and may be fixed to the inner cover via the two snap springs.

According to one embodiment of the invention, the inner cover may have a cylindrical barrel, and the bearings and the shaft sleeve may be installed in the barrel via the snap springs.

According to one embodiment of the invention, the electric self-balancing vehicle may further include a decorative lamp disposed at the bottom cover.

According to one embodiment of the invention, the top cover may further include two indicating screens electrically connected with the controller. One indicating screen may display a remaining capacity of the power supply, and the other indicating screen may display a working state of the electric self-balancing vehicle.

According to one embodiment of the invention, the sensor may include a gyroscope, an acceleration sensor, and an inductive switch, the inductive switch may sense whether a user stands on the electric self-balancing vehicle so as to be on or off, the controller may receive the sensing signal of the inductive switch to control the hub motors to work or to stop, and the controller may receive the sensing signals of the acceleration sensor and the gyroscope to control the hub motors to change a state or to keep the state.

According to one embodiment of the invention, the inductive switch may be an infrared photoelectric sensor.

According to one embodiment of the invention, the electric self-balancing vehicle may further include a charging interface disposed at the bottom cover.

According to one embodiment of the invention, the electric self-balancing vehicle may further include an interface cover covering the charging interface.

According to one embodiment of the invention, the electric self-balancing vehicle may further include a limiting shaft disposed between the first inner cover and the second inner cover, and the length of the limiting shaft in the second inner cover may be larger than the length of the limiting shaft in the first inner cover.

According to one embodiment of the invention, the top cover may have two arc-shaped projections, and the two arc-shaped projections may be located above the two wheels and may cover a part of the wheels, respectively.

According to one embodiment of the invention, the width of the arc-shaped projections may be larger than the width of the wheels.

According to one embodiment of the invention, the top cover and the bottom cover may be made of plastic, and the inner cover may be made of aluminum alloy.

According to one embodiment of the invention, the electric self-balancing vehicle may further include a remote controller, and the controller may receive a control signal sent by the remote controller.

According to one embodiment of the invention, the controller may have a storage unit and a correction unit, the storage unit may store an initial balance state of the electric self-balancing vehicle, and the correction unit may correct a current balance state of the electric self-balancing vehicle.

In summary, according to the invention, the inner cover is uniquely disposed between the top cover and the bottom cover of the electric self-balancing vehicle, such that the entire structure of the electric self-balancing vehicle is firmer, and electronic elements inside the vehicle body are protected at the same time. Further, a space for fixing the electronic elements is formed between the inner cover and the bottom cover, such that the electronic elements are installed more compactly. The power supply and the controller are disposed in two parts of the vehicle body, respectively. Therefore, one power supply and one controller can control the two hub motors simultaneously, the assembly is easier, the wiring is more convenient, and more space is saved. Meanwhile, the weights on both sides of the vehicle body are better balanced thus to improve the self-balance of the vehicle body. According to the present invention, the wheels are located at the left and right edges of the vehicle body. Thus, the wheels with larger sizes can be used. Compared with the existing self-balancing vehicle with wheels installed at the bottom of the bottom cover, the electric self-balancing vehicle has considerable movement distance and speed advantages. Further, the hub motors are adopted in the present invention, and the motors are directly installed in the wheels. Accordingly, the structure of the electric self-balancing vehicle is more compact. Compared with the self-balancing vehicle singly installed with a motor, more space is saved and the entire device is more compact.

These and other features, aspects, and advantages of the present invention will become better understood with regard to the following description, appended claims, and accompanying drawings.

DETAILED DESCRIPTION OF THE INVENTION

Figure 1:
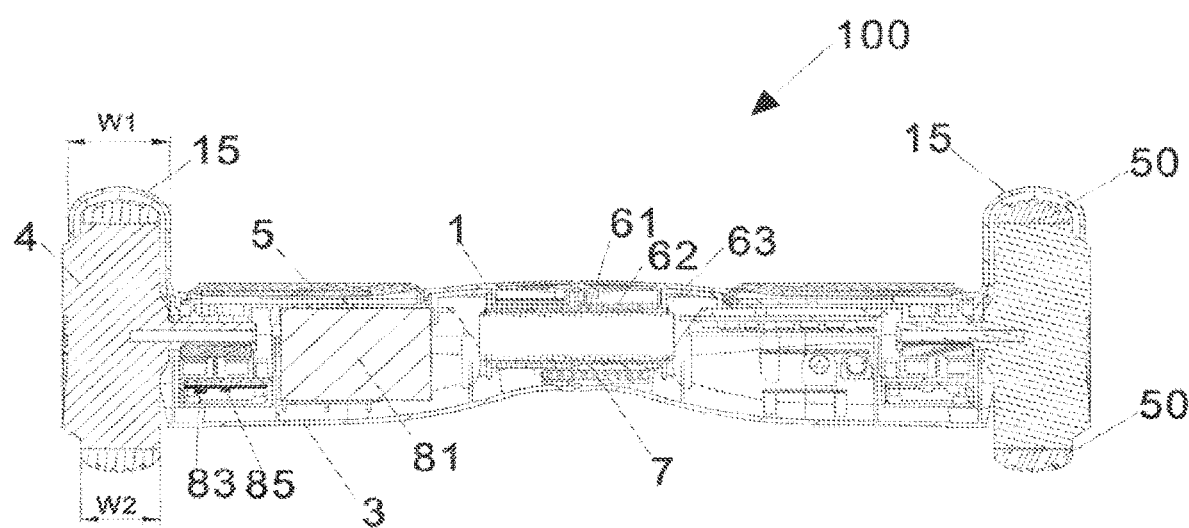
FIG. 1 is a sectional view showing an electric self-balancing vehicle according to a first embodiment of the present invention.
Figure 2:
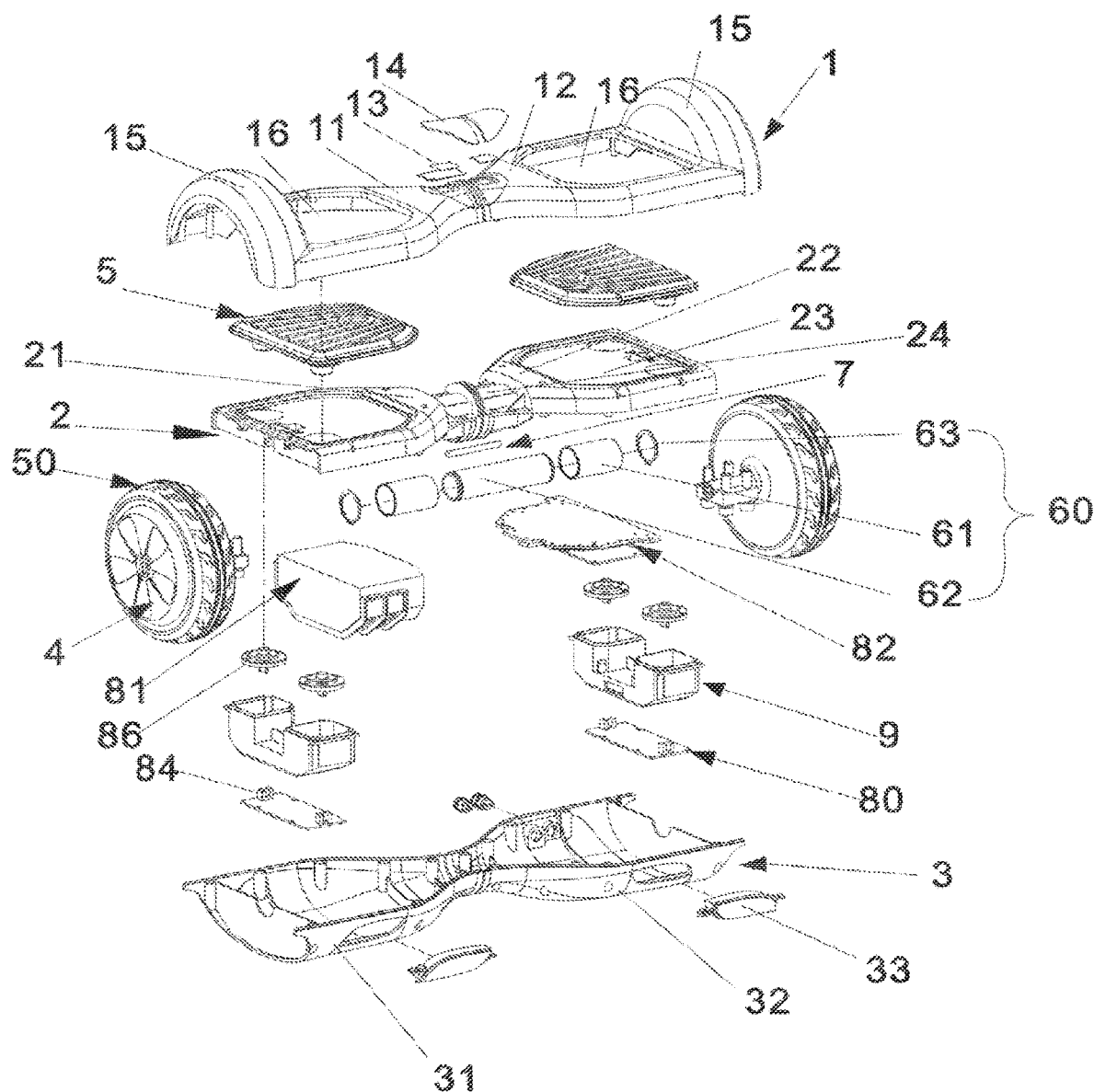
FIG. 2 is an exploded schematic diagram showing the electric self-balancing vehicle according to the first embodiment of the invention.
Figure 3:
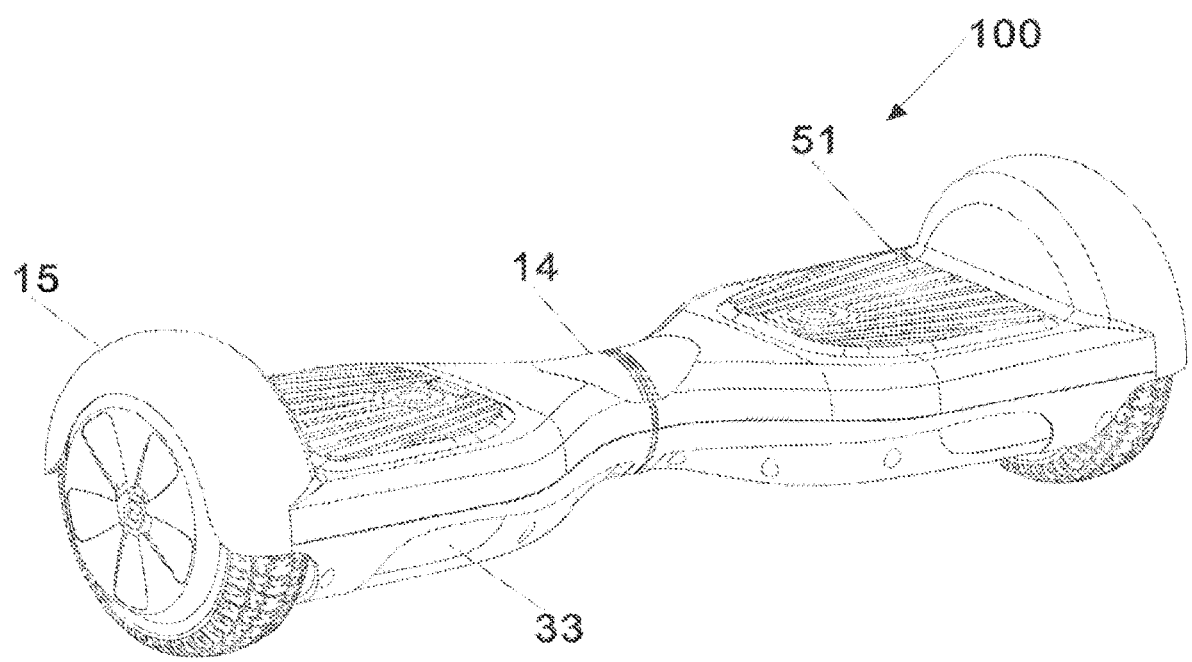
FIG. 3 is a schematic diagram showing the electric self-balancing vehicle according to the first embodiment of the invention.
Figure 4:
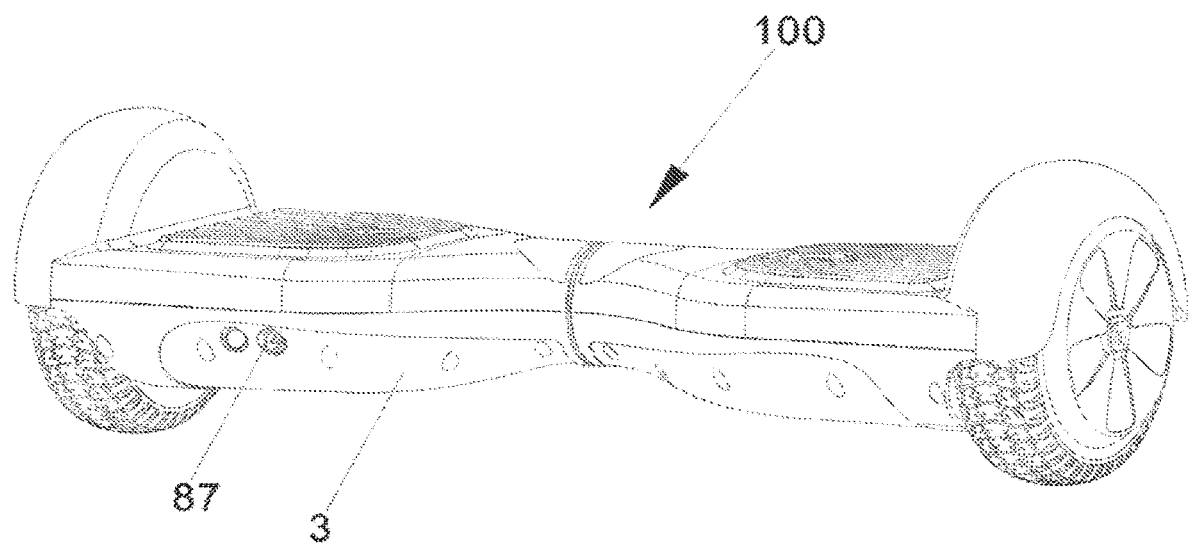
FIG. 4 is a schematic diagram showing the electric self-balancing vehicle at another angle according to the first embodiment of the invention.
Figure 5:
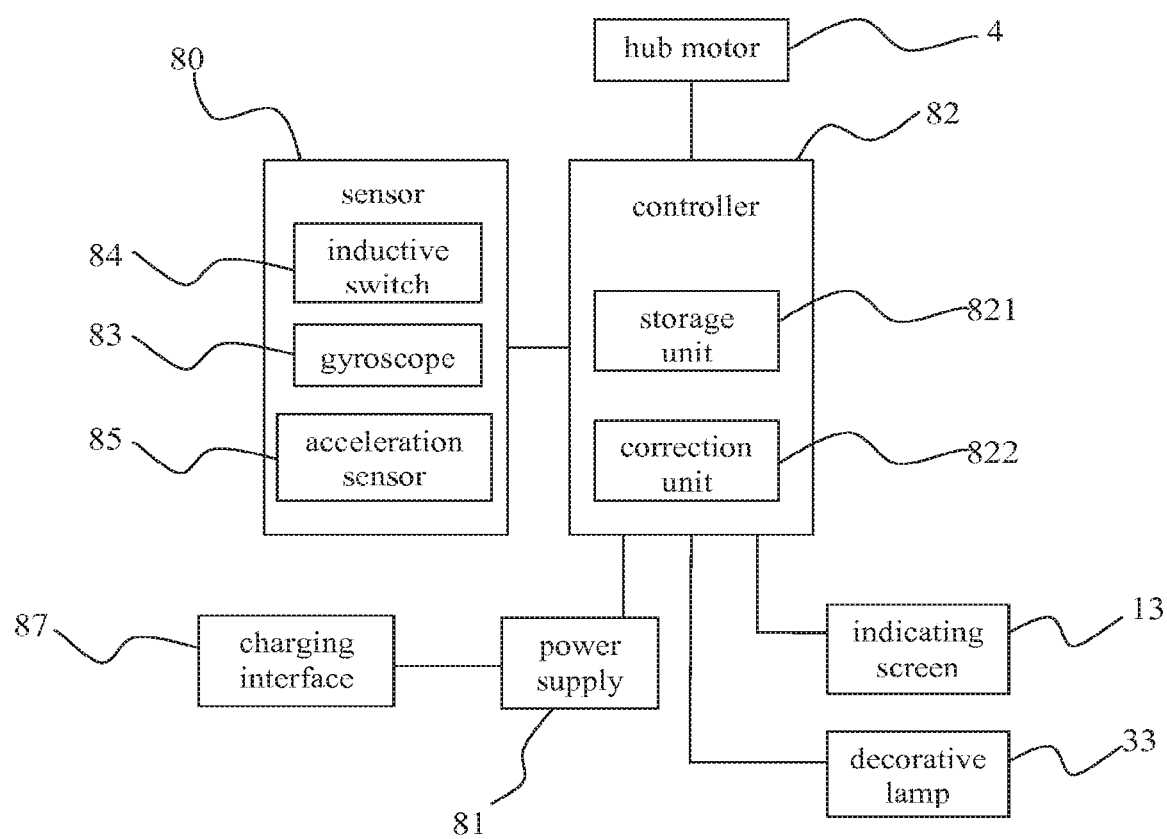
FIG. 5 is a partial functional block diagram of the electric self-balancing vehicle according to the first embodiment of the invention.

Please refer to FIG. 1 to FIG. 5 together. An electric self-balancing vehicle 100 in this embodiment includes a top cover 1, an inner cover 2, a bottom cover 3, two hub motors 4, two wheels 50, a rotating mechanism 60, a plurality of sensors 80, a power supply 81, and a controller 82.

The top cover 1 includes a first top cover 11 and a second top cover 12, and the first top cover 11 and the second top cover 12 are disposed symmetrically and rotatable relative to each other. When the electric self-balancing vehicle 100 is in a using state, the top cover 1 is located at the top. The first top cover 11 may be a left top cover, and the second top cover 12 may be a right top cover. However, the invention is not limited thereto. When the electric self-balancing vehicle 100 is rotated 180 degrees horizontally, the first top cover 11 becomes the right top cover, and the second top cover 12 becomes the left top cover.

The shapes of the first top cover 11 and the second top cover 12 are basically the same, and the first top cover 11 and the second top cover 12 can rotate relative to each other under the action of the rotating mechanism 60. The inward parts of the first top cover 11 and the second top cover 12 are connected to form an X shape, and two indicating screens 13 are disposed at the inner ends. The indicating screens 13 are electrically connected with the controller 82, wherein one of the indicating screens 13 can display a remaining capacity of the power supply 81, and the other indicating screen 13 can display a working state of the electric self-balancing vehicle 100. In actual application, a transparent outer cover 14 is disposed on each indicating screen 13 for protecting the indicating screen 13 and facilitating reading for a user. The indicating screen 13 displaying the working state can display different icons (for example, a battery icon and the like) according to different modes of the electric self-balancing vehicle 100, for example, a low speed mode, a high speed mode, a normal system state, a locked state and the like, thereby enabling the user to intuitively and clearly understand the working state of the electric self-balancing vehicle 100.

In the embodiment, outward parts of the first top cover 11 and the second top cover 12 have arc-shaped projections 15, respectively, and the two arc-shaped projections 15 are located above the two wheels 50 and cover a part of the wheels 50, respectively. In the first embodiment, the width W1 of each of the arc-shaped projections 15 is larger than the width W2 of each of the wheels 50. The arc-shaped projections 15 completely cover the tops of the wheels 50. Due to this arrangement, the arc-shaped projections 15 can effectively block muddy water splashed when the wheels 50 walk. Meanwhile, a hanging object (for example, an overlong waistband of the clothes of the user) is prevented from being accidentally rolled into the wheels in a moving process to cause possible injury of the user, so that the safety of the electric self-balancing vehicle 100 is improved. However, the invention is not limited thereto. In other embodiments, the arc-shaped projections 15 can be designed to be narrow at two ends and wide in the middle.

The bottom cover 3 is fixed to the top cover 1. In actual application, the top cover 1 and the bottom cover 3 can be fixed together by screws. In the present invention, the top cover 1, the inner cover 2, and the bottom cover 3 jointly form the framework of the electric self-balancing vehicle 100, and after the top cover 1 and the bottom cover 3 are fixed together, the inner cover 2 is covered inside the vehicle body and is not exposed. When the electric self-balancing vehicle 100 is in the using state, the bottom cover 3 is located at the bottom.

The bottom cover 3 includes a first bottom cover 31 and a second bottom cover 32, and the first bottom cover 31 and the second bottom cover 32 are disposed symmetrically and rotatable relative to each other. The shapes of the first bottom cover 31 and the second bottom cover 32 are basically the same, and the first bottom cover 31 and the second bottom cover 32 can rotate relative to each other under the action of the rotating mechanism 60. The inward parts of the first bottom cover 31 and the second bottom cover 32 are connected to form an X shape. Similarly, the first bottom cover 31 may be a left bottom cover, and the second bottom cover 32 may be a right bottom cover. When the electric self-balancing vehicle 100 is rotated 180 degrees horizontally, the first bottom cover 1 becomes the right bottom cover, and the second bottom cover 32 becomes the left bottom cover.

In the embodiment, the bottom cover 3 has two decorative lamps 33 for increasing the beautiful appearance and playing an illumination role at the same time. The shells of the decorative lamps 33 may be transparent for transmitting light. In actual application, the decorative lamps 33 may be electrically connected with the controller 82, so that the decorative lamps 33 can reflect a driving state of the electric self-balancing vehicle 100 to remind surrounding people, thereby improving the using safety. For example, when the electric self-balancing vehicle 100 advances, the decorative lamps 33 may stay lit; when the electric self-balancing vehicle 100 retreats, the decorative lamps 33 may flash; when the electric self-balancing vehicle 100 turns left, the decorative lamp 33 at the left side may flash or stay lit, and the decorative lamp 33 at the right side may be off; when the electric self-balancing vehicle 100 turns right, the decorative lamp 33 at the right side may flash or stay lit, and the decorative lamp 33 at the left side may be off The lighting states of the decorative lamps 33 are not limited in the invention.

The inner cover 2 is fixed between the top cover 1 and the bottom cover 3. The inner cover 2 includes a first inner cover 21 and a second inner cover 22, and the first inner cover 21 and the second inner cover 22 are disposed symmetrically and rotatable relative to each other. The shapes of the first inner cover 21 and the second inner cover 22 are basically the same, and the first inner cover 21 and the second inner cover 22 can rotate relative to each other under the action of the rotating mechanism 60. The rotating mechanism 60 may be installed in the middle of the inner cover 2, and the longitudinally installed hub motors 4 are fixed to the left and right edges. In the embodiment, the first inner cover 21 and the second inner cover 22 are interconnected to form an entirety. However, the invention is not limited thereto. In other embodiments, the first inner cover 21 and the second inner cover 22 may be mutually separated and independent components. Similarly, the first inner cover 21 may be a left inner cover, and the second inner cover 22 may be a right inner cover. When the electric self-balancing vehicle 100 is rotated 180 degrees horizontally, the first inner cover 21 becomes the right inner cover, and the second inner cover 22 becomes the left right cover.

In the embodiment, the electric self-balancing vehicle 100 further includes two pedals 5, and the pedals 5 are fixed to the top cover 1 and the inner cover 2. To enable the user to stand more stably in the moving process, mutually separated friction strips 51 are disposed on the upper surface of each pedal 5 of the self-balancing vehicle 100 in the embodiment to increase the friction force.

To fix the pedals 5 and reduce the volume of the self-balancing vehicle 100, the first top cover 11 and the second top cover 12 have hollow spaces 16, respectively, the first inner cover 21 and the second inner cover 22 have recesses 23 at positions corresponding to the hollow spaces 16, respectively, and the hollow spaces 16 and the recesses 23 are mutually combined to form pedal cavities (not shown in FIG. 2) for containing the pedals 5. In actual application, the hollow spaces 16 are penetrated in the top cover 1, the recesses 23 are not penetrated in the inner cover 2, and the shapes of the hollow spaces 16 and the recesses 23 are matched with the shapes of the pedals 5. The pedal cavities are containing spaces having bottom surfaces and side walls formed after the combination of the hollow spaces 16 with the recesses 23.

When in use, the pedals 5 directly carry the user. The inner cover 2 is used as the internal framework of the entire self-balancing vehicle 100 to indirectly bear the weight of the user transferred by the pedals 5, thereby preventing electronic elements between the inner cover 2 and the bottom cover 3 from being extruded by the weight of the user. Therefore, the entire electric self-balancing vehicle 100 is firmer and stronger, and the electronic elements therein are protected, such that the self-balancing vehicle 100 operates more stably and has longer service life. Preferably, the inner cover 2 is made of aluminum alloy. Thus, the strength is higher, and the structure is more stable. The top cover 1 and the bottom cover 3 are made of plastic, so that the weight of the entire vehicle body is reduced, the processes, such as spray coating, coloring and so on, are conveniently carried out on the appearance of the vehicle body, and antifouling and waterproof functions are achieved. Since the conventional electric self-balancing vehicle does not include the inner cover 2, the internal electronic elements directly bear the weight of the user, and due to the shaking generated during the driving process of the conventional self-balancing vehicle, an automatic power off situation is easy to occur, and the user is easy to fall down during driving. The electric self-balancing vehicle 100 in the present invention has solved this technical problem.

The rotating mechanism 60 is fixed between the first inner cover 21 and the second inner cover 22. In the first embodiment, the rotating mechanism 60 includes two bearings 61, a shaft sleeve 62, and two snap springs 63. The two bearings 61 are fixed to the inner ends of the first inner cover 21 and the second inner cover 22, respectively. The shaft sleeve 62 is fixed inside the two bearings 61 and is fixed to the inner cover 2 via the two snap springs 63. Thus, the left and right inner covers of the inner cover 2 can rotate under the cooperation of the rotating mechanism 60. Due to the arrangement of the rotating mechanism 60, the two parts of the vehicle body of the electric self-balancing vehicle 100 can rotate freely and relatively.

To install the rotating mechanism 60, a cylindrical barrel 24 may be designed at the inward ends of the first inner cover 21 and the second inner cover 22, and the bearings 61 and the shaft sleeve 62 are installed in the barrel 24 via the snap springs 63 from outside to inside. In order to limit an overlarge relative rotation angle between the first inner cover 21 and the second inner cover 22, the electric self-balancing vehicle 100 further includes a limiting shaft 7, and the length of the limiting shaft 7 in the second inner cover 22 is larger than the length of the limiting shaft 7 in the first inner cover 21. In the embodiment, the limiting shaft 7 is located between the inward ends of the first inner cover 21 and the second inner cover 22.

The two wheels 50 are rotatably fixed at two sides of the inner cover 2, respectively, and the two hub motors 4 are fixed in the two wheels 50, respectively. The hub motor 4 is also called in-wheel motor, wherein power, transmission, and braking devices are incorporated into a hub, so that a large quantity of transmission components can be omitted, the structure of the self-balancing vehicle can be simpler, a better space utilization rate can be obtained, and the transmission efficiency can be improved at the same time. Since the hub motor 4 have the characteristic of independently driving a single wheel, differential steering similar to a crawler-type vehicle can be achieved by different rotating speeds and even by inversion of the left and right wheels 50, so that the turning radius of the vehicle can be greatly reduced, and in-situ steering can be nearly achieved under a particular condition.

The plurality of sensors 80 are disposed between the bottom cover 3 and the inner cover 2. In detail, a half of the sensors 80 are disposed between the first bottom cover 31 and the first inner cover 21, and the other half of the sensors 80 are disposed between the second bottom cover 32 and the second inner cover 22. The power supply 81 is fixed between the first bottom cover 31 and the first inner cover 21. The controller 82 is fixed between the second bottom cover 32 and the second inner cover 22. In the present invention, only one power supply 81 and one controller 82 are required to simultaneously control the two hub motors 4, so that the assembling is easier, the wiring is more convenient, and the repairing of the sold electric self-balancing vehicle 100 returned to the factory is more convenient. Moreover, the power supply 81 and the controller 82 are disposed in two half parts of the vehicle body, respectively. Thus, more space is saved, and the structure of the entire vehicle body is more compact. An electric wire connecting the power supply 81 and the controller 82 and the electric wires connecting the controller 82 and the hub motors 4 can penetrate through the joint of the two half parts of the vehicle body, that is the electric wires penetrate from the left half part (or the right half part) of the vehicle body to the right half part (or the left half part).

In the embodiment, the sensors 80 include a gyroscope 83, an inductive switch 84, and an acceleration sensor 85. In actual application, to modularize the internal elements of the entire device, the acceleration sensor 85 and the gyroscope 83 are disposed on the same circuit board. Due to a visual angle, only the front surface of the circuit board can be seen in FIG. 2, and the acceleration sensor 85 and the gyroscope 83 (indicated by dotted lines in FIG. 2) are disposed on the back surface of the circuit board in actual application. The controller 82 is electrically connected with the plurality of sensors 80, the power supply 81, and the hub motors 4, and the controller 82 controls the hub motors 4 to drive the corresponding wheels 50 to rotate according to sensing signals transmitted by the sensors 80.

The inductive switch 84 senses whether the user stands on the electric self-balancing vehicle 100 so as to be on or off, the controller 82 receives the sensing signal (i.e., the on or off signal) of the inductive switch 84 to control the hub motors 4 to work or to stop, and the controller 82 receives the sensing signals of the acceleration sensor 85 and the gyroscope 83 to control the hub motors 4 to change the state or to keep the state. In the first embodiment, the inductive switch 84 is an infrared photoelectric sensor. However, the invention is not limited thereto. In other embodiments, the inductive switch 84 may be a microwave inductive switch, an ultrasonic inductive switch, or any other inductive switches capable of achieving the same function. In the embodiment, the electric self-balancing vehicle 100 further includes a blocking element 86. When the user stamps on the pedals 5, the blocking element 86 will block an infrared induction area of the infrared photoelectric sensor, and thus the infrared photoelectric sensor is started. The controller 82 receives a starting signal sent by the inductive switch 84, thereby driving the hub motors 4 to work.

The wheels of the self-balancing vehicle in the prior art start rotating automatically once the self-balancing vehicle is enabled, so that the user cannot easily stand on the self-balancing vehicle. When the user gets off from the self-balancing vehicle, the wheels do not stop rotating, and the entire wheels stop rotating only after the power switch is turned off. Thus, a very huge potential risk exists, and the using is very inconvenient. When the electric self-balancing vehicle 100 in the embodiment is enabled, the hub motors 4 do not work, while the wheels 50 are driven by sensing whether the user stands on the pedals 5, thereby avoiding the blind rotating situation of the self-balancing vehicle in the prior art and greatly improving the using safety. On the other hand, the electric self-balancing vehicle 100 in the embodiment achieves automatic balance after sensing the stamping instead of balancing once the power supply is turned on, so that the safety of the vehicle body can be guaranteed, the rotation of the vehicle body is little to avoid the problem in the prior art that automatic balance is achieved once the power supply is turned on to cause a wrong balance point of the vehicle body and the vehicle body rotates to result in unbalance of the user.

The acceleration sensor 85 and the gyroscope 83 detect the motion state of the self-balancing vehicle 100 together, for example, the acceleration, the angular speed and the like of the self-balancing vehicle 100. The controller 82 drives the hub motors 4 according to the sensing signals transmitted by the acceleration sensor 85 and the gyroscope 83, thereby determining to change the direction or the speed of the self-balancing vehicle 100 or not. The detection technology of the acceleration sensor 85 and the gyroscope 83 is conventional and will not be described herein for a concise purpose.

In the embodiment, the electric self-balancing vehicle 100 further includes a U-shaped fixing element 9. The sensors 80 and the blocking element 86 are fixed to the U-shaped fixing element 9, in order to achieve modularized installation of the electronic elements of the entire device to facilitate the assembly, wiring and the subsequent maintenance.

In practice, the user drives a part or two parts of the vehicle body to twist by forces of the feet, in order to drive the sensors 80 to send the sensing signals to the controller 82. The controller 82 drives the hub motors 4 to operate according to an internal control program, to enable the user to turn, advance or retreat, so that "foot control" is achieved, the use is more convenient, and the control is more flexible.

How the controller 82 in the present invention controls the self-balancing vehicle to achieve a self-balancing state and controls the wheels 50 to advance, retreat or turn belongs to the prior art, and will not be described herein for a concise purpose. Specific reference can refer to currently disclosed self-balancing vehicle control methods and control technologies adopted by self-balancing vehicle production enterprises. For example, the Chinese patent application No. 201320050547.3, entitled BALANCE CONTROL DEVICE FOR INTELLIGENT BALANCING VEHICLE AND INTELLIGENT BALANCING VEHICLE, wherein the control device may be the controller 82 in the embodiment. Or, for example, the Chinese patent application No. 201220367045.9, entitled CIRCUIT CONTROL DEVICE FOR CONTROLLING BALANCING VEHICLE MOTOR BY USING CPLD. Certainly, in actual application, other control devices and control methods can also be selected, for example, the control method described in the Chinese patent application No. 201310516158.X, entitled CONTROL METHOD FOR TWO-WHEELED SELF-BALANCING VEHICLE.

In the embodiment, the electric self-balancing vehicle 100 further includes a charging interface 87, and the charging interface 87 is disposed at the bottom cover 3. Specifically, the charging interface 87 is disposed at the outer side of the bottom cover 3 for charging the power supply 81 conveniently.

In the embodiment, the controller 82 has a storage unit 821 and a correction unit 822, the storage unit 821 stores an initial balance state of the electric self-balancing vehicle 100, and the correction unit 822 corrects a current balance state of the electric self-balancing vehicle 100. Specifically, after the electric self-balancing vehicle 100 is delivered out of the factory, the data when the vehicle body is placed horizontally is recorded in the storage unit 821. After the electric self-balancing vehicle 100 is used for a period of time, due to external environments, such as temperature and so on, and using situations such as shaking, the sensors 80 of the electric self-balancing vehicle 100 may deviate to a certain extent, so that the horizontal reference value of the electric self-balancing vehicle 100 will change correspondingly. At that time, if the horizontal data adopted when leaving the factory is still adopted, the electric self-balancing vehicle 100 is controlled inaccurately. After long term use, accidents may happen. A correction program is stored in the correction unit 822 in the embodiment. When the correction program is operated, the electric self-balancing vehicle 100 detects the real-time conditions of the sensors 80 and judges and compares the real-time conditions with the initial horizontal data, so as to determine whether to overwrite the original data for resetting. By setting the correction program, the control accuracy and the service life of the electric self-balancing vehicle 100 are greatly improved, and the problem in the prior art that the flexibility and the accuracy of the self-balancing vehicle decline after the self-balancing vehicle is used for a period of time is solved.

Figure 6:
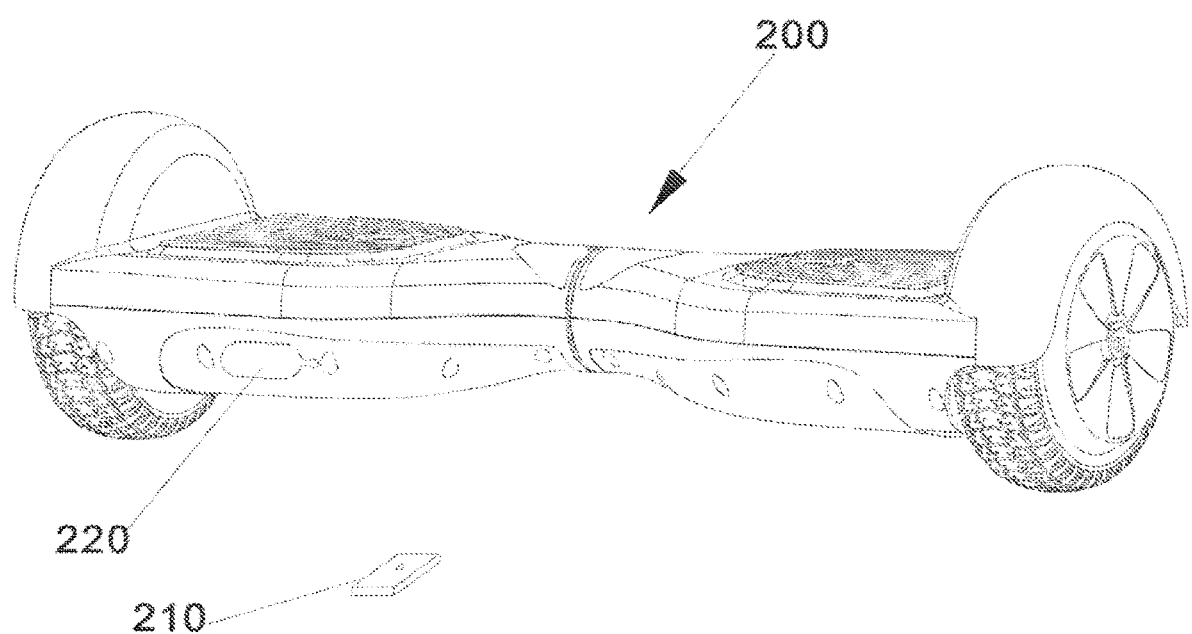
FIG. 6 is a schematic diagram showing an electric self-balancing vehicle according to a second embodiment of the invention.

FIG. 6 is a schematic diagram showing an electric self-balancing vehicle according to a second embodiment of the invention. Please refer to FIG. 6, The only difference between the electric self-balancing vehicle 200 in the second embodiment and the electric self-balancing vehicle 100 in the first embodiment lies in that the electric self-balancing vehicle 200 further includes a remote controller 210, and the controller receives a control signal sent by the remote controller 210. Remote control of the electric self-balancing vehicle 200 can be achieved by the remote controller 210. A startup button and a correction button and the like can be disposed on the remote controller 210. However, the invention is not limited thereto. The electric self-balancing vehicle 200 further includes an interface cover 310, and the interface cover 220 covers the charging interface. The interface cover 220 can prevent muddy water splashed by operating the electric self-balancing vehicle 200 from polluting the charging interface and even entering the vehicle body.

In summary, according to the invention, the inner cover is uniquely disposed between the top cover and the bottom cover of the electric self-balancing vehicle, such that the entire structure of the electric self-balancing vehicle is firmer, and the electronic elements inside the vehicle body are protected at the same time. Further, the space for fixing the electronic elements is formed between the inner cover and the bottom cover, such that the electronic elements are installed more compactly. The power supply and the controller are disposed in two parts of the vehicle body, respectively. Therefore, one power supply and one controller can control the two hub motors simultaneously, the assembly is easier, the wiring is more convenient, and more space is saved. Meanwhile, the weights on both sides of the vehicle body are better balanced thus to improve the self-balance of the vehicle body. According to the present invention, the wheels are located at the left and right edges of the vehicle body. Thus, the wheels with larger sizes can be used. Compared with the existing self-balancing vehicle with wheels installed at the bottom of the bottom cover, the electric self-balancing vehicle has considerable movement distance and speed advantages. Further, the hub motors are adopted in the present invention, and the motors are directly installed in the wheels. Accordingly, the structure of the electric self-balancing vehicle is more compact. Compared with the self-balancing vehicle singly installed with a motor, more space is saved and the entire device is more compact.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

We claim:

1. An electric balance vehicle, comprising:
a top cover;
a bottom cover;
an inner cover fixed between the top cover and the bottom cover, the inner cover comprising a first inner cover and a second inner cover rotatable relative to each other;
a rotating mechanism fixed between the first inner cover and the second inner cover;
two wheels rotatably fixed at two sides of the inner cover, each wheel comprising a hub motor fixed in the wheel;
a plurality of sensors;
a power supply; and
a controller electrically connected with the plurality of sensors, the power supply, and the hub motors, wherein the controller is configured to control the hub motors to drive the two wheels to rotate according to signals from the plurality of sensors.

2. The electric balance vehicle according to any of claim 1, wherein the plurality of sensors comprise a gyroscope, an acceleration sensor, and an inductive switch, the inductive switch senses whether a user stands on the electric balance vehicle, the controller receives signals from the inductive switch, the acceleration sensor, and the gyroscope to control the hub motors.

3. The electric balance vehicle according to claim 2, wherein the inductive switch is an infrared photoelectric sensor.

4. The electric balance vehicle according to claim 1, wherein the controller generates control signals to drive the hub motors when signal from an inductive switch indicates a user is on the vehicle, and wherein the controller does not generate control signals to drive the hub motors when signal from the inductive switch indicates no user is on the vehicle.

5. The electric balance vehicle according to claim 1, wherein the bottom cover is coupled to the top cover.

6. The electric balance vehicle according to claim 1, wherein the power supply and the controller are disposed at a side of the inner cover, and the side is adjacent to the bottom cover.

7. The electric balance vehicle according to claim 1, wherein the plurality of sensors, the power supply, and the controller are disposed between the bottom cover and the inner cover.

8. An electric balance vehicle, comprising:
a top cover;
a bottom cover;
an inner cover positioned between the top cover and the bottom cover, the inner cover comprising a first inner cover and a second inner cover disposed symmetrically and rotatable relative to each other, the inner cover comprising a left edge and a right edge;
a rotating mechanism disposed between the first inner cover and the second inner cover and comprising a shaft sleeve installed in inner ends of the first inner cover and the second inner cover, the first inner cover and the second inner cover capable of rotating relative to each other through the rotating mechanism; and
wheels rotatably fixed to the left edge and the right edge, respectively.

9. The electric balance vehicle according to claim 8, wherein the rotating mechanism comprises two bearings disposed in the inner ends of the first inner cover and the second inner cover, respectively; and the shaft sleeve is disposed inside the two bearings.

10. An electric balance vehicle, comprising:
an inner cover comprising a first inner cover and a second inner cover disposed symmetrically and rotatable relative to each other;
wheels rotatably fixed at two opposite sides of the inner cover, respectively;
motors configured to drive the wheels, respectively;
a plurality of sensors comprising at least one gyroscope;
a power supply; and
a controller electrically connected with the plurality of sensors, the power supply, and the motors, wherein the controller controls the motors to drive the wheels to rotate in response to signals received from the sensors.

11. The electric balance vehicle according to claim 10, further comprising a top cover and a bottom cover, wherein the inner cover is disposed between the top cover and the bottom cover, the top cover comprises a first top cover and a second top cover disposed symmetrically and rotatable relative to each other, and the bottom cover comprises a first bottom cover and a second bottom cover disposed symmetrically and rotatable relative to each other.

12. The electric balance vehicle according to claim 10, wherein the motors are hub motors fixed in the wheels.

13. The electric balance vehicle according to claim 12, wherein the vehicle comprises only two wheels and two hub motors.

14. The electric balance vehicle according to claim 10, further comprising:
a rotating mechanism, wherein the first inner cover and the second inner cover are capable of rotating relative to each other through the rotating mechanism.

15. The electric balance vehicle according to claim 14, wherein the rotating mechanism comprises a shaft sleeve installed in at least one of inner ends of the first inner cover and the second inner cover.

16. The electric balance vehicle according to claim 15, wherein the at least one of inner ends of the first inner cover and the second inner cover comprises a cylindrical barrel, and the shaft sleeve is installed in the cylindrical barrel.

17. The electric balance vehicle according to claim 16, wherein the rotating mechanism comprises a bearing installed in the cylindrical barrel, and the shaft sleeve is installed in the bearing.

18. The electric balance vehicle according to claim 15, wherein the inner ends of the first inner cover and the second inner cover comprise cylindrical barrels, the rotating mechanism comprises two bearings, and the two bearings and the shaft sleeve are installed in the cylindrical barrels.

19. The electric balance vehicle according to claim 10, wherein the plurality of sensors comprise an acceleration sensor, and an inductive switch; the inductive switch senses whether a user stands on the electric balance vehicle; and the controller receives signals from the inductive switch, the acceleration sensor, and the gyroscope to control the motors.

20. The electric balance vehicle according to claim 10, wherein the controller generates control signals to drive the hub motors when signal from an inductive switch indicates a user is on the vehicle, and wherein the controller does not generate control signals to drive the hub motors when signal from the inductive switch indicates no user is on the vehicle.

21. The electric balance vehicle according to claim 20, wherein the inductive switch is an infrared photoelectric sensor.

22. The electric balance vehicle according to claim 10, further comprising two pedals, wherein the first inner cover and the second inner cover have recesses, respectively; and the two pedals are disposed in the recesses, respectively.

23. The electric balance vehicle according to claim 22, further comprising a top cover, wherein the top cover comprises a first top cover and a second top cover disposed symmetrically and rotatable relative to each other, the first top cover and the second top cover have hollow spaces, respectively; the recesses are at positions corresponding to the hollow spaces, respectively; and the hollow spaces are combined with the recesses to form pedal cavities for containing the pedals.

24. The electric balance vehicle according to claim 10, further comprising a blocking element, wherein the plurality of sensors comprise an inductive switch; the blocking element is configured to block an induction area of the inductive switch to trigger the inductive switch sending signals to the controller; and the controller is configured to receive signals from the inductive switch to control the motors.

25. An electric balance vehicle, comprising:
a top cover;
a bottom cover;
an inner cover positioned between the top cover and the bottom cover, the inner cover comprising a first inner cover and a second inner cover disposed symmetrically and rotatable relative to each other, the inner cover extending from a first outer edge to a second outer edge;
a rotating mechanism disposed between the first inner cover and the second inner cover and comprising a shaft sleeve installed in a first cylindrical barrel at a first inner end of the first inner cover and installed in a second cylindrical barrel at a second inner end of the second inner cover, wherein the first inner cover and the second inner cover capable of rotating relative to each other through the rotating mechanism;

a first wheel rotatably fixed at the first outer edge of the inner cover, the first wheel comprising a first hub motor;

a second wheel rotatable fixed at the second outer edge of the inner cover, the second wheel comprising a second hub motor;

a power supply disposed between the top cover and the bottom cover for providing power to the first hub motor and the second hub motor;

a plurality of sensors disposed between the top cover and the bottom cover, the plurality of sensors comprising a gyroscope and an acceleration sensor; and a controller electrically connected with the plurality of sensors, the power supply, and the first and second hub motors, the controller configured for controlling the first and second hub motors to drive the first and second wheels to rotate in response to signals received from the sensors.

\* \* \* \* \*

(12) INTER PARTES REVIEW CERTIFICATE (3380th)
United States Patent
Cao et al.

(10) Number: US 10,597,107 K1
(45) Certificate Issued: Jan. 19, 2024

(54) ELECTRIC VEHICLE

(71) Applicants: Shaojun Cao; Jiawei Ying

(72) Inventors: Shaojun Cao; Jiawei Ying

(73) Assignee: HANGZHOU CHIC INTELLIGENT TECHNOLOGY CO., LTD.

Trial Number:

IPR2022-00844 filed Apr. 7, 2022

Inter Partes Review Certificate for:

Patent No.: 10,597,107
Issued: Mar. 24, 2020
Appl. No.: 16/658,020
Filed: Oct. 18, 2019

The results of IPR2022-00844 are reflected in this inter partes review certificate under 35 U.S.C. 318(b).

INTER PARTES REVIEW CERTIFICATE
U.S. Patent 10,597,107 K1
Trial No. IPR2022-00844
Certificate Issued Jan. 19, 2024

AS A RESULT OF THE INTER PARTES REVIEW PROCEEDING, IT HAS BEEN DETERMINED THAT:

Claims 1 and 4-25 are cancelled.

\* \* \* \* \*